(12) United States Patent
Melan-Moutet

(10) Patent No.: US 11,591,147 B2
(45) Date of Patent: Feb. 28, 2023

(54) SCREW CAPPING DEVICE INTENDED TO REMAIN TETHERED TO A CONTAINER AFTER OPENING OF THE CONTAINER

(71) Applicant: SOCIÉTÉ LORRAINE DE CAPSULES MÉTALLIQUES-MANUFACTURE DE BOUCHAGE, Contrexéville (FR)

(72) Inventor: Mathias Melan-Moutet, Reims (FR)

(73) Assignee: SOCIÉTÉ LORRAINE DE CAPSULES MÉTALLIQUES-MANUFACTURE DE BOUCHAGE, Contrexéville (FR)

( * ) Notice: Subject to any disclaimer, the term of this patent is extended or adjusted under 35 U.S.C. 154(b) by 0 days.

(21) Appl. No.: 17/111,174

(22) Filed: Dec. 3, 2020

(65) Prior Publication Data

US 2021/0171257 A1 Jun. 10, 2021

(30) Foreign Application Priority Data

Dec. 4, 2019 (FR) ...................................... 1913760

(51) Int. Cl.
*B65D 55/16* (2006.01)
*B29D 1/00* (2006.01)
*B65D 41/34* (2006.01)

(52) U.S. Cl.
CPC .............. *B65D 55/16* (2013.01); *B29D 1/00* (2013.01); *B65D 41/3428* (2013.01)

(58) Field of Classification Search
CPC ................ B65D 41/045; B65D 41/325; B65D 41/3428; B65D 55/16; B65D 55/165;
(Continued)

(56) References Cited

U.S. PATENT DOCUMENTS 3,424,330 A 1/1969 Marcel
4,180,174 A * 12/1979 Quinn .................. B65D 50/048
215/217
(Continued)

FOREIGN PATENT DOCUMENTS

CN 102700822 A 10/2012
FR 2856663 A1 12/2004
(Continued)

OTHER PUBLICATIONS

Rapport De Recherche Preliminaire dated Aug. 18, 2020, issued in corresponding French Application No. 1913760, filed Dec. 4, 2019, 2 pages.

*Primary Examiner* — Steven A. Reynolds
*Assistant Examiner* — Prince Pal
(74) *Attorney, Agent, or Firm* — Christensen O'Connor Johnson Kindness PLLC

(57) ABSTRACT

Screw capping devices are configured to remain tethered to a container after opening of the container. The screw capping devices include a cylindrical wall having a section having an end closed by a bottom and a section having an open end, the section being connected to the section by a circumferential junction having a non-breakable connection and a breakable connection, the section further having a breakable connection extending parallel to the circumferential junction, the breakable connection and the breakable connection being configured to be broken during a first unscrewing of the section. The breaking of the breakable connections creates two arms retaining the section to the container.

12 Claims, 3 Drawing Sheets

(58) Field of Classification Search
CPC ............... B65D 43/16; B65D 43/164; B65D 2251/1008; B65D 2401/35; B65D 41/34; B65D 41/3447; B65D 2401/30; A47G 19/2266; A45C 13/007; B29D 1/00
USPC ....... 215/252, 253, 277, 349, 306, 251, 250, 215/217; 220/375, 810, 827, 829
See application file for complete search history.

(56) References Cited

U.S. PATENT DOCUMENTS

| | | | | |
|---|---|---|---|---|
| 4,241,841 A * | 12/1980 | Boller | ................... | B65D 41/48 |
| | | | | 215/252 |
| 4,394,918 A * | 7/1983 | Grussen | ............ | B65D 41/3428 |
| | | | | 215/253 |
| 5,074,425 A * | 12/1991 | Wustmann | ......... | B65D 41/3447 |
| | | | | 215/252 |
| 5,215,204 A * | 6/1993 | Beck | ..................... | B65D 55/16 |
| | | | | 215/258 |
| 5,246,125 A * | 9/1993 | Julian | ................ | B65D 41/3447 |
| | | | | 215/252 |
| 5,360,126 A * | 11/1994 | Snyder | ............... | B65D 41/3447 |
| | | | | 215/252 |
| 6,112,923 A * | 9/2000 | Ma | ..................... | B65D 41/3428 |
| | | | | 215/44 |
| 7,922,018 B2 | 4/2011 | Granger et al. | | |
| 8,469,213 B2 * | 6/2013 | Ishii | .................. | B65D 41/3428 |
| | | | | 220/837 |
| 10,836,544 B2 * | 11/2020 | Kim | ...................... | B65D 41/48 |
| 10,988,292 B2 * | 4/2021 | Giovannini | ........ | B65D 39/0052 |
| 2005/0211657 A1 * | 9/2005 | Mallet | ................ | B65D 41/3428 |
| | | | | 215/349 |
| 2008/0197100 A1 * | 8/2008 | Faulconnier | ........... | B65D 41/62 |
| | | | | 215/250 |
| 2008/0264893 A1 * | 10/2008 | Battegazzore | ......... | B65D 41/62 |
| | | | | 215/252 |
| 2009/0301987 A1 * | 12/2009 | Luzzato | ............... | B65D 41/045 |
| | | | | 215/253 |
| 2010/0258521 A1 * | 10/2010 | Bertolaso | ........... | B65D 41/3438 |
| | | | | 53/484 |
| 2011/0174760 A1 * | 7/2011 | Luzzato | ................ | B65D 41/48 |
| | | | | 215/258 |
| 2011/0253666 A1 * | 10/2011 | Keller | .................. | B65D 41/045 |
| | | | | 215/350 |
| 2012/0285921 A1 * | 11/2012 | Kwon | .................... | B65D 55/16 |
| | | | | 215/243 |
| 2019/0009943 A1 * | 1/2019 | Komet | ........... | B65D 41/3428 |
| 2019/0344944 A1 * | 11/2019 | Maguire | ................ | B65D 47/147 |
| 2021/0122532 A1 * | 4/2021 | Dreyer | .................... | B65D 55/16 |
| 2021/0229873 A1 * | 7/2021 | Berroa García | ....... | B65D 55/16 |
| 2021/0300648 A1 * | 9/2021 | Bassi | .................... | B65D 55/16 |
| 2021/0362910 A1 * | 11/2021 | Morgan | ................ | B65D 55/16 |
| 2021/0371168 A1 * | 12/2021 | Graux | ............. | B65D 41/3447 |

FOREIGN PATENT DOCUMENTS

| | | | | |
|---|---|---|---|---|
| WO | WO-2021053488 A1 * | 3/2021 | ............. | B65D 55/16 |
| WO | WO-2021068058 A1 * | 4/2021 | ............. | B65D 55/16 |

* cited by examiner

SCREW CAPPING DEVICE INTENDED TO REMAIN TETHERED TO A CONTAINER AFTER OPENING OF THE CONTAINER

CROSS REFERENCE TO RELATED APPLICATION

This application claims priority under 35 U.S.C. § 119 to French Patent Application No. 1913760, filed Dec. 4, 2019, which is incorporated by reference herein in its entirety.

FIELD

Embodiments of the present disclosure relate to a capping device configured to close (or block) the neck of a container and to remain tethered to the container after opening of the neck.

BACKGROUND

For ecological reasons, in most countries, new regulations impose or will impose that the capping device of a container, such as a bottle, remains tethered to the container, even when the capping device leaves the neck of the container open.

There are already containers closed with a screw capping device, but most often, these devices are not tethered to their container when the neck of the container is open. Consequently, to comply with the new regulations, the bottling lines which are configured to mount these screw capping devices on their containers require a sometimes complex and expensive adaptation to adapt the bottling line such that these capping devices are tethered to their container.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure aim to overcome these disadvantages by providing a screw capping device configured to remain tethered to the container which demands no adaptation of the assembly lines.

To this end, the present disclosure provides a screw capping device configured to remain tethered to a container after opening of the container.

According to an aspect of the present disclosure, the capping device comprises a cylindrical wall having a longitudinal axis, an end closed by a bottom and an open end, the cylindrical wall comprising a first section comprising the closed end and a second section comprising the open end, the second section extending the first section according to the longitudinal axis, the first section having an inner surface comprising a threading arranged to cooperate with a threading arranged on a neck of the container, the first section being configured to be alternatively in a closed position, wherein the first section is screwed on the neck and an open position, wherein the first section is unscrewed from the neck and the neck is open, the second section having an inner surface comprising a projecting circular element arranged to cooperate with a retaining element arranged on the container to retain the second section to the container, the first section being connected to the second section by a circumferential junction comprised in a plane perpendicular to the longitudinal axis, the circumferential junction comprising a non-breakable connection extending symmetrically over a first predetermined distance on either side of a generator of the cylindrical wall and a first breakable connection completing the circumferential junction, the second section further comprising a second breakable connection extending parallel to the circumferential junction, the second breakable connection extending symmetrically over a second predetermined distance on either side of the generator of the cylindrical wall, the second predetermined distance being greater than the first predetermined distance, the first breakable connection and the second breakable connection being able of being broken during a first unscrewing of the first section.

Thus, thanks to the breaking of the breakable connections during the first opening, arms are formed, which enables the first section to be retained to the second section. The second section is retained to the container by the co-operation of the projecting circular element and the retaining element, and the first section remains tethered to the container.

In some embodiments, the second breakable connection has a rounded portion facing the non-breakable connection, the rounded portion having a peak opposite the circumferential junction.

In some embodiments, the peak of the rounded portion is comprised by the generator of the cylindrical wall.

In some embodiments, the projecting circular element comprises a plurality of distributed parts separated from one another in a plane perpendicular to the longitudinal axis.

In some embodiments, the parts each comprise a hooking rail supported by at least one gusset.

In some embodiments, the capping device comprises a seal covering the bottom of the closed end of the cylindrical wall, the seal being arranged to come into contact with a free end of the neck of the container when the first section is in the closed position.

In some embodiments, the capping device comprises lugs arranged to retain the seal against the bottom when the free end of the neck is not in contact with the seal.

In another aspect, the present disclosure provides containers comprising a neck adapted to be blocked by a capping device such as specified above.

In another aspect, embodiments of the present disclosure provide methods for manufacturing a capping device.

According to one representative embodiment of the present disclosure, the method comprises the following steps:
 moulding a cylindrical wall having a longitudinal axis, an end closed by a bottom and an open end, the cylindrical wall comprising a first section comprising the closed end and a second section comprising the open end, the second section extending the first section according to the longitudinal axis, the first section having an inner surface comprising a threading arranged to cooperate with a threading arranged on a neck of the container, the first section being configured to be alternatively in a closed position wherein the first section is screwed on the neck and an open position wherein the first section is unscrewed from the neck and the neck is opened, the second section having an inner surface comprising a projecting circular element arranged to cooperate with a retaining element arranged on the container to retain the second section to the container,
 cutting a first breakable connection and a second breakable connection, such:
  that the first section is connected to the second section by a circumferential junction comprised in a plane perpendicular to the longitudinal axis, the circumferential junction comprising a non-breakable connection extending symmetrically over a first predetermined distance on either side of a generator of the cylindrical wall and the first breakable connection completing the circumferential junction, and that the second section comprises the second breakable connection extending parallel to the circumferential junction, the second breakable connection extending symmetrically over a second predetermined distance on either side of the generator of the cylindrical wall, the second predetermined distance being greater than the first predetermined distance, the first breakable connection and the second breakable connection being able of being broken during a first unscrewing of the first section from the neck of the container.

In some embodiments, the cutting step comprises the cutting of the first breakable connection and of the second breakable connection by a two-blade device, each of the blades corresponding to a three-dimensional blade.

In some embodiments, the cutting step is preceded by a step of inserting the seal such that it covers the bottom of the closed end of the cylindrical wall, the seal being inserted to contact the free end of the neck of the container when the first section is in the closed position.

DESCRIPTION OF THE DRAWINGS

The foregoing aspects and many of the attendant advantages of this present disclosure will become more readily appreciated as the same become better understood by reference to the following detailed description, when taken in conjunction with the accompanying drawings, wherein.

DETAILED DESCRIPTION

Figure 1:
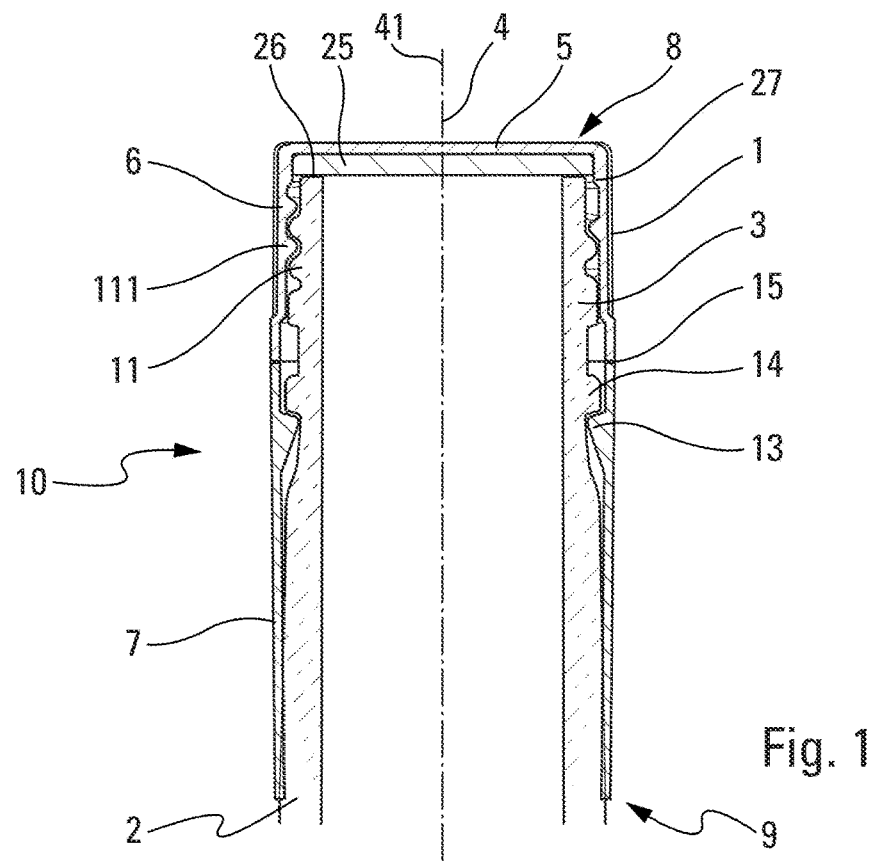
FIG. 1 shows a longitudinal, cross-sectional view of the capping device in the closed position, according to one representative embodiment of the present disclosure.
Figure 2:
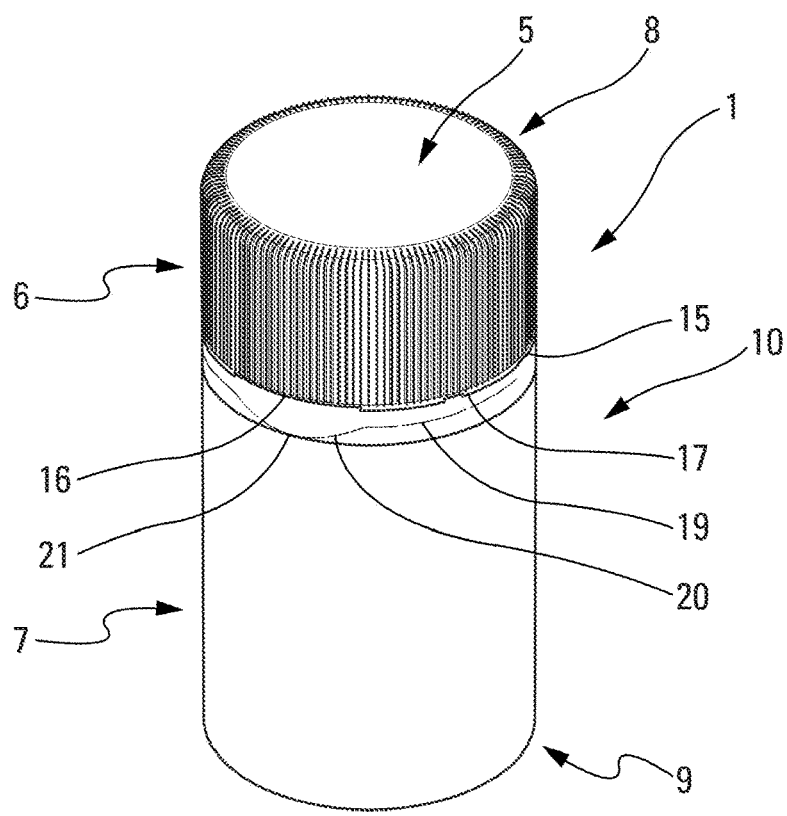
FIG. 2 shows a perspective view of the capping device of FIG. 1.

FIG. 1 represents a representative screw capping device 1 of the present disclosure, which is configured to remain tethered to a container 2, such as a bottle, after opening of the container 2.

The container 2 comprises a neck 3. The neck 3 is either integrally formed with the remainder of the container 2, for example when the container 2 is a glass or plastic bottle, or adapted to be permanently secured to a wall of the container 2, at the level of an opening passing through this wall. In some embodiments, the neck 3 has a tubular shape having a central longitudinal axis 41 of the neck 3.

The capping device 1 comprises a cylindrical wall 10 having a longitudinal axis 4. The cylindrical wall has a bottom 5, a closed end 8, which is closed by the bottom 5 and an open end 9.

The cylindrical wall 10 comprises a section 6 comprising the closed end 8 and a section 7 comprising the open end 9. The section 7 extends the section 6 according to the longitudinal axis 4.

The section 6 has an inner surface comprising a threading 111 arranged to cooperate with a threading 11 arranged on the neck 3 of the container 2.

The section 6 is configured to be alternatively in a closed position wherein the section 6 is screwed on the neck 3 and an open position wherein the section 6 is unscrewed from the neck 3 and the neck 3 is open. In the closed position, the central longitudinal axis 41 of the neck 3 is substantially coincident with the longitudinal axis 4.

The section 7 has an inner surface 12 comprising a projecting circular element 13 arranged to cooperate with a retaining element 14 arranged on the container 2 (for example, on the neck 3) to retain the section 7 to the container 2.

The section 6 is connected to the section 7 by a circumferential junction 15 comprised in a plane perpendicular to the longitudinal axis 4. The circumferential junction 15 comprises a non-breakable connection 16 extending symmetrically over a predetermined distance d1 on either side of a generator 18 of the cylindrical wall 10 and a breakable connection 17 completing the circumferential junction 15. Thus, the non-breakable connection 16 and the breakable connection 17 form the circumferential junction 15.

A generator of a cylindrical surface corresponds to a straight line which is displaced in the space according to a circle, according to a constant direction. The generator 18 corresponds to this straight line at a given place of the cylindrical wall 10.

The section 7 further comprises a breakable connection 19 extending parallel to the circumferential junction 15. The breakable connection 19 extends symmetrically over a predetermined distance d2 on either side of the generator 18 of the cylindrical wall 10. The predetermined distance d2 is advantageously greater than the predetermined distance d1.

The breakable connections 17 and 19 can take various embodiments. For example, they can include a succession of frangible jumpers which are regularly distributed. These jumpers can be obtained by moulding or by cutting.

In a non-limiting manner, the distance d1 is comprised between one tenth of the length of diameter of the cylindrical wall 10 and the half of the length of the diameter of the cylindrical wall 10. The distance d2 is comprised between the half of the length of the diameter of the cylindrical wall 10 and the length of the diameter of the cylindrical wall 10.

The breakable connection 17 and the breakable connection 19 are configured to be broken during a first unscrewing of the section 6 in view of the opening of the container 2.

When the breakable connections 17 and 19 are broken, the portions of the cylindrical wall 10 between the breakable connections 17 and 19 form arms 28 which extend to the portion of the generator 18. These arms retain the section 6 to the section 7 which is retained to the neck 3 of the container 2 by the co-operation of the circular element 13 and the retaining element 14. Each of the arms 28 is sized to provide a flexibility allowing the section 6 to be displaced in translation along the longitudinal axis 4 during the unscrewing of the section 6 until the section 6 is completely unscrewed. Moreover, the arms 28 are sized to resist a maximum traction force, sufficient to prevent the removal of the section 6 from the section 7. The traction force can be defined according to a normal use of the capping device 1. The maximum traction force can be defined according to the standards fixed for the opening of a capping device 1. In a non-limiting manner, the arms 28 are sized such that the maximum traction force is substantially equal to 35N.

According to an advantageous configuration, the breakable connection 19 has a rounded portion 20 (or smile-shaped) facing the non-breakable connection 16. The rounded portion 20 having a peak 21 opposite the circumferential junction 15.

This rounded portion 20 makes it possible to block the rotation of the capping device 1 around the neck 3 by supporting this portion against the neck 3 of the container 2.

Figure 7:
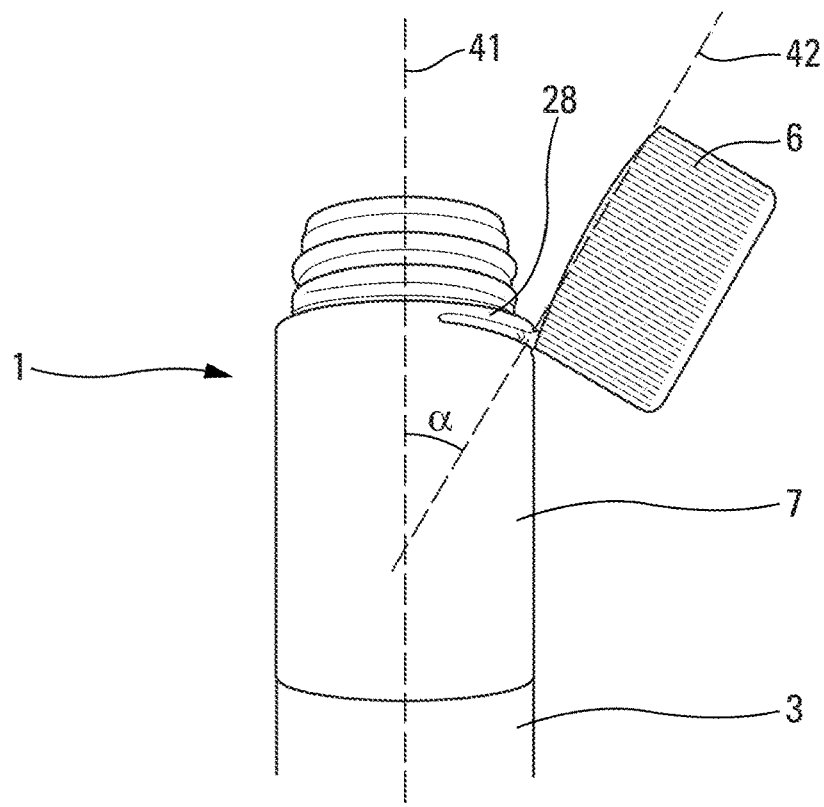
FIG. 7 represents a perspective view of the capping device in the open position, mounted on a container according to one representative embodiment of the present disclosure.

In addition, the rounded portion 20 also makes it possible to block the capping device such that a plane 42 of the section 6 perpendicular to the longitudinal axis 4 forms a non-zero angle of inclination a with the central longitudinal axis 41 of the neck 3 (FIG. 7). In a non-limiting manner, the angle of inclination a is comprised between 20° and 90°, for example 45°.

The peak 21 of the rounded portion 20 is comprised by the generator 18 of the cylindrical wall 10 from which the non-breakable connection 16 and the breakable connection 19 extend.

In a non-limiting manner, the distance h between the peak 21 and the circumferential junction 15 corresponds substantially to one eighth of the diameter of the cylindrical wall 10 with a 5% tolerance, for example.

Figure 3:
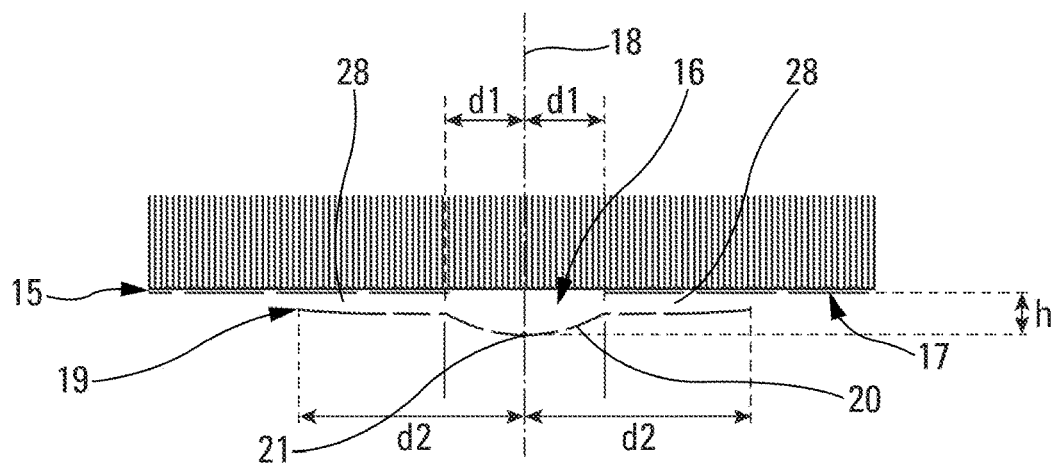
FIG. 3 shows a schematic view of the capping device of FIG. 1, of which the cylindrical wall has been unwound.
Figure 4:
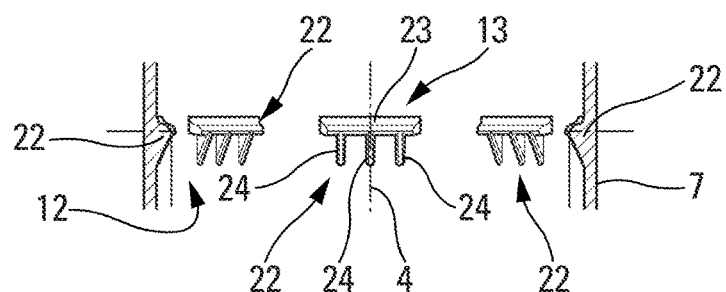
FIG. 4 shows a longitudinal cross-section of the capping device of FIG. 1 at the level of the projecting circular element.
Figure 5:
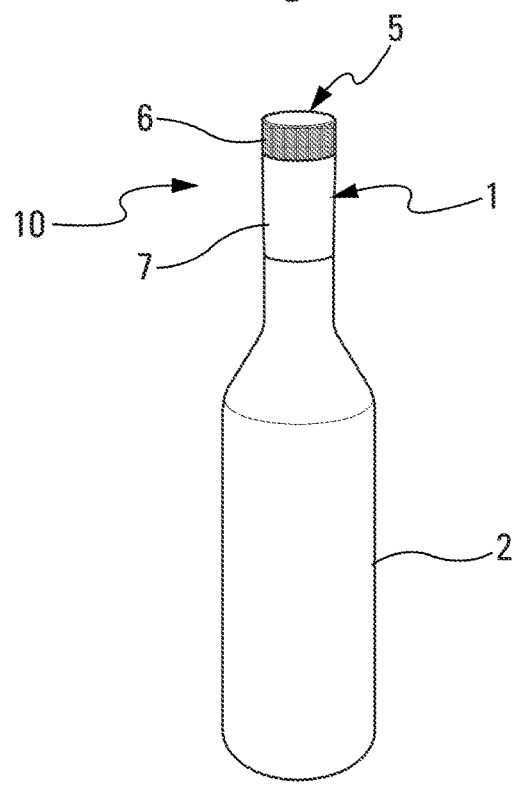
FIG. 5 shows a perspective view of a container equipped with a capping device, according to one representative embodiment of the present disclosure.
Figure 6:
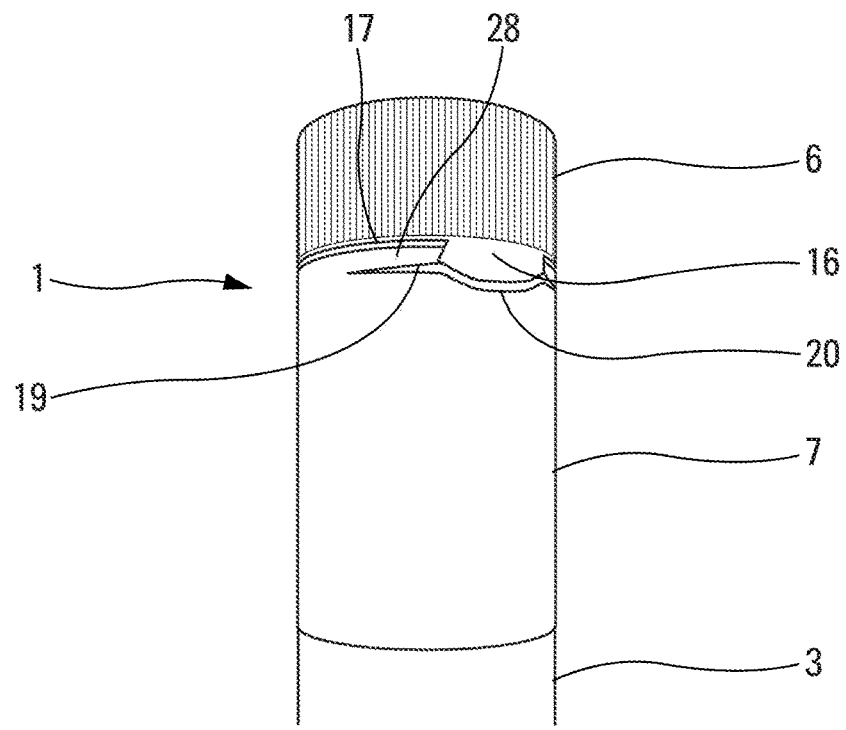
FIG. 6 shows a perspective view of the capping device in the closed position, mounted on a container, according to one representative embodiment of the present disclosure.

As represented in FIG. 3, the rounded portion 20 can have an axis of symmetry combined with the generator 18.

Moreover, the projecting circular element 13 can comprise a plurality of distributed parts 22 separated from one another in a plane perpendicular to the longitudinal axis 4.

According to a configuration, the parts 22 each comprise a hooking rail 23 supported by at least one gusset 24. This configuration of parts 22 makes it possible to limit the piping defects during the moulding of the capping device 1.

The capping device 1 can also comprise a seal 25 covering the bottom 5 of the closed end 8 of the cylindrical wall 10. The seal 25 is arranged to come into contact with a free end 26 of the neck 3 of the container 2 when the section 6 is in the closed position.

Advantageously, the capping device 1 comprises lugs 27 arranged to retain the seal 25 against the bottom 5 when the free end 26 of the neck 3 is not in contact with the seal 25.

The lugs 27 are distributed over the inner surface of the section 6.

The present disclosure also concerns a method for manufacturing the capping device 1.

The method comprises a step of moulding the cylindrical wall 10 and a step of cutting the breakable connection 17 and the breakable connection 19.

The cutting step can comprise the cutting of the breakable connection 17 and the breakable connection 19 by a two-blade device, each of the blades corresponding to a three-dimensional blade.

The capping device 1 can also be manufactured by a three-dimensional printing device.

Moreover, the method can comprise a step of inserting the seal 25 preceding the cutting step. The seal is inserted such that said seal 25 covers the bottom 5 of the closed end 8 of the cylindrical wall 10. The seal 25 is inserted such that it can come into contact with the free end 26 of the neck 3 of the container 2 when the first section 6 is in the closed position.

While illustrative embodiments have been illustrated and described, it will be appreciated that various changes can be made therein without departing from the spirit and scope of the invention.

The present application may also reference quantities and numbers. Unless specifically stated, such quantities and numbers are not to be considered restrictive, but representative of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed. Numerical ranges shall be interpreted to include the upper and lower bounds unless expressly stated otherwise.

The detailed description set forth above in connection with the appended drawings, where like numerals reference like elements, are intended as a description of various representative embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "upper," "lower," "top," and "bottom," etc. These references, and other similar references in the present application, are intended to assist in helping describe and understand the particular embodiment (such as when the embodiment is positioned for use) and are not intended to limit the present disclosure to these directions or locations.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A screw capping device configured to remain tethered to a container after opening of the container, comprising:
a cylindrical wall having a longitudinal axis, an end closed by a bottom, and an open end, the cylindrical wall comprising a first section comprising the closed end and a second section comprising the open end, the second section extending the first section according to the longitudinal axis,
wherein the first section has an inner surface comprising an inner threading arranged to cooperate with a neck threading arranged on a neck of the container, the first section being configured to be alternatively in a closed position wherein the first section is screwed on the neck and an open position, wherein the first section is unscrewed from the neck and the neck is open,
wherein the second section has an inner surface comprising a projecting circular element arranged to cooperate with a retaining element arranged on the container to retain the second section to the container,
wherein the first section is connected to the second section by a circumferential junction comprised in a plane perpendicular to the longitudinal axis, the circumferential junction comprising a non-breakable connection extending symmetrically over a first predetermined distance on either side of a generator of the cylindrical wall and a first breakable connection completing the circumferential junction,
wherein the second section comprises a second breakable connection extending parallel to the circumferential junction, the second breakable connection extending symmetrically starting from the generator of the cylindrical wall to a second predetermined distance on either side of the generator of the cylindrical wall, the second predetermined distance being greater than the first predetermined distance, and
wherein the first breakable connection and the second breakable connection are configured to be broken during a first unscrewing of the first section.

2. The screw capping device according to claim 1, wherein the second breakable connection has a rounded portion facing the non-breakable connection, the rounded portion having a peak directed opposite the circumferential junction.

3. The screw capping device according to claim 2, wherein the peak of the rounded portion is comprised by the generator of the cylindrical wall.

4. The screw capping device according to claim 1, wherein the projecting circular element comprises a plurality of distributed parts separated from one another along the plane perpendicular to the longitudinal axis.

5. The screw capping device according to claim 4, wherein each of the plurality of distributed parts comprise a hooking rail supported by at least one gusset.

6. The screw capping device according to claim 1, further comprising a seal covering the bottom of the closed end of the cylindrical wall, the seal being arranged to contact a free end of the neck of the container when the first section is in the closed position.

7. The screw capping device according to claim 6, further comprising lugs arranged to retain the seal against the bottom when the free end of the neck is not in contact with the seal.

8. A container comprising a neck adapted to be blocked by the screw capping device according to claim 1.

9. A method for manufacturing a screw capping device, comprising:
moulding a cylindrical wall having a longitudinal axis, an end closed by a bottom end, an open end, the cylindrical wall comprising a first section comprising the closed end and a second section comprising the open end, the second section extending the first section according to the longitudinal axis, the first section having an inner surface comprising a threading arranged to cooperate with a threading arranged on a neck of a container, the first section being configured to be alternatively in a closed position wherein the first section is screwed on the neck and an open position wherein the first section is unscrewed from the neck and the neck is open, the second section having an inner surface comprising a projecting circular element arranged to cooperate with a retaining element arranged on the container to retain the second section to the container;
cutting a first breakable connection and a second breakable connection such that:
the first section is connected to the second section by a circumferential junction comprised in a plane perpendicular to the longitudinal axis, the circumferential junction comprising a non-breakable connection extending symmetrically over a first predetermined distance on either side of a generator of the cylindrical wall and the first breakable connection completing the circumferential junction, and
the second section comprises the second breakable connection extending parallel to the circumferential junction, the second breakable connection extending symmetrically starting from the generator of the cylindrical wall to a second predetermined distance on either side of the generator of the cylindrical wall, the second predetermined distance being greater than the first predetermined distance, the first breakable connection and the second breakable connection being able of being broken during a first unscrewing of the first section from the neck of the container.

10. The method according to claim 9, wherein cutting the first breakable connection and the second breakable connection comprises cutting the first breakable connection and the second breakable connection with a two-blade device.

11. The method according to claim 9, wherein cutting the first breakable connection and the second breakable connection is preceded by inserting a seal such that it covers the bottom of the closed end of the cylindrical wall, the seal being inserted to come into contact with the free end of the neck of the container when the first section is in the closed position.

12. The screw capping device according to claim 1, wherein the second breakable connection has a rounded portion facing the non-breakable connection, the rounded portion having a peak toward the second section.

* * * * *